(12) United States Patent
Okano et al.

(10) Patent No.: US 11,437,076 B2
(45) Date of Patent: Sep. 6, 2022

(54) DRIVE INCORPORATING WIRELESS COMPONENTS

(71) Applicants: Kabushiki Kaisha Toshiba, Tokyo (JP); Toshiba Electronic Devices & Storage Corporation, Tokyo (JP)

(72) Inventors: Taichi Okano, Fuchu Tokyo (JP); Jia Liu, Yokohama Kanagawa (JP); Nobuhiro Yamamoto, Yokohama Kanagawa (JP); Kota Tokuda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 98 days.

(21) Appl. No.: 17/015,763

(22) Filed: Sep. 9, 2020

(65) Prior Publication Data

US 2021/0295876 A1 Sep. 23, 2021

(30) Foreign Application Priority Data

Mar. 18, 2020 (JP) .............................. JP2020-047786

(51) Int. Cl.

| | |
|---|---|
| *G11B 33/12* | (2006.01) |
| *G11B 33/02* | (2006.01) |
| *H02J 50/40* | (2016.01) |
| *H02J 7/02* | (2016.01) |
| *H02J 50/20* | (2016.01) |
| *G11B 33/14* | (2006.01) |

(52) U.S. Cl.
CPC .......... *G11B 33/027* (2013.01); *G11B 33/121* (2013.01); *G11B 33/122* (2013.01); *G11B 33/1446* (2013.01); *G11B 33/1466* (2013.01); *H02J 7/02* (2013.01); *H02J 50/20* (2016.02); *H02J 50/40* (2016.02)

(58) Field of Classification Search
None
See application file for complete search history.

(56) References Cited

U.S. PATENT DOCUMENTS 6,667,846 B2 * 12/2003 Kano ...................... G11B 27/11
                                                                     360/137
7,251,088 B2    7/2007 Matsui
(Continued)

FOREIGN PATENT DOCUMENTS

| JP | 2005-11458 A | 1/2005 |
|---|---|---|
| JP | 2006-24316 A | 1/2006 |

(Continued)

*Primary Examiner* — Jefferson A Evans
(74) *Attorney, Agent, or Firm* — Allen & Overy LLP (57) ABSTRACT

According to one embodiment, a disk device includes a housing having a first transmission hole, a magnetic disk, a head, a first sealing material having an inner surface and an outer surface and closing the first transmission hole, and a first wireless power feeding device having a first power feeding antenna. The first power feeding antenna is located mere inward of the housing than the outer surface of the first sealing material, and receives power transmitted through the first sealing material by wireless power feeding.

17 Claims, 7 Drawing Sheets

(56) References Cited

U.S. PATENT DOCUMENTS

| | | | |
|---|---|---|---|
| 8,159,777 B2* | 4/2012 | Zadesky | G06F 1/1626 |
| | | | 360/99.13 |
| 10,902,879 B2* | 1/2021 | Mendonsa | G06F 3/0611 |
| 2004/0253922 A1* | 12/2004 | deBlanc | H05K 7/1445 |
| | | | 455/344 |
| 2008/0180829 A1* | 7/2008 | Tokunaka | G11B 23/284 |
| 2013/0109317 A1 | 5/2013 | Kikuchi et al. | |
| 2017/0294215 A1* | 10/2017 | Yamasaki | G11B 33/1493 |
| 2018/0149536 A1* | 5/2018 | Choe | G11B 33/1466 |
| 2018/0240503 A1* | 8/2018 | Yoshida | G11B 17/0405 |
| 2018/0337477 A1 | 11/2018 | Yamamoto et al. | |
| 2018/0359845 A1* | 12/2018 | Park | H01Q 1/243 |
| 2021/0225412 A1* | 7/2021 | Okano | G06F 1/1698 |
| 2021/0242565 A1* | 8/2021 | Kim | H01Q 1/22 |
| 2021/0407550 A1* | 12/2021 | Okano | G06F 1/266 |
| 2022/0037761 A1* | 2/2022 | Liu | G06F 3/0676 |

FOREIGN PATENT DOCUMENTS

| | | |
|---|---|---|
| JP | 2006-236497 A | 9/2006 |
| JP | 2007-193880 A | 8/2007 |
| JP | 2014-3653 A | 1/2014 |
| JP | 2018-195367 A | 12/2018 |

\* cited by examiner

DRIVE INCORPORATING WIRELESS COMPONENTS

CROSS-REFERENCE TO RELATED APPLICATIONS

This application is based upon and claims the benefit of priority from Japanese Patent Application No. 2020-047786, filed Mar. 18, 2020, the entire contents of which are incorporated herein by reference.

FIELD

Embodiments described herein relate generally to a disk device.

BACKGROUND

As a disk device, a magnetic disk drive comprises a housing having a base and a top cover, and a rotatable magnetic disk and an actuator supporting a magnetic head are disposed inside the housing. As a method of improving the performance of the disk drive, a method of reducing the rotational resistances of the magnetic disk and the magnetic head by sealing a low-density gas such as helium in the housing has been proposed.

A transmission hole is formed in the housing. In order to maintain airtightness in the housing, the transmission hole of the housing is closed with a sealing board. The sealing board is composed of a printed circuit board. The magnetic disk drive is located on the outer side of the housing and comprises a control circuit board fixed to the housing. The control circuit board and the sealing board are connected to each other by a connector. By the connector, wired power feeding can be performed from the control circuit board to the sealing board.

DETAILED DESCRIPTION

In general, according to one embodiment, there is provided a disk device comprising a housing having a first transmission hole, a magnetic disk disposed in a rotatable manner inside the housing, a head disposed inside the housing and recording and reproducing information on and from the magnetic disk, a first sealing material having an inner surface facing an inner side of the housing and an outer surface exposed to an outer side of the housing, and closing the first transmission hole, and a first wireless power feeding device having a first power feeding antenna. The first power feeding antenna is located more inward of the housing than the outer surface of the first sealing material, and receives power transmitted through the first sealing material by wireless power feeding.

According to another embodiment, there is provided a disk device comprising a housing having a first insertion hole, a magnetic disk disposed in a rotatable manner inside the housing, a head disposed inside the housing and recording and reproducing information on and from the magnetic disk, a power feeding wiring drawn through the first insertion hole and located inside and outside the housing, a first sealant closing the first insertion hole together with the power feeding wiring, and a first wireless power feeding device having a first power feeding antenna. The first power feeding antenna is located on an outer side of the housing, is electrically connected to the power feeding wiring, and receives power transmitted from outside the housing by wireless power feeding.

Embodiments will be described hereinafter with reference to the accompanying drawings. The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by the same reference numbers, and detailed explanations of them are omitted unless necessary.

The disk devices will be explained. Embodiments where the disk devices are applied to hard disk drives (HDDs) will be explained.

First Embodiment

Figure 1:
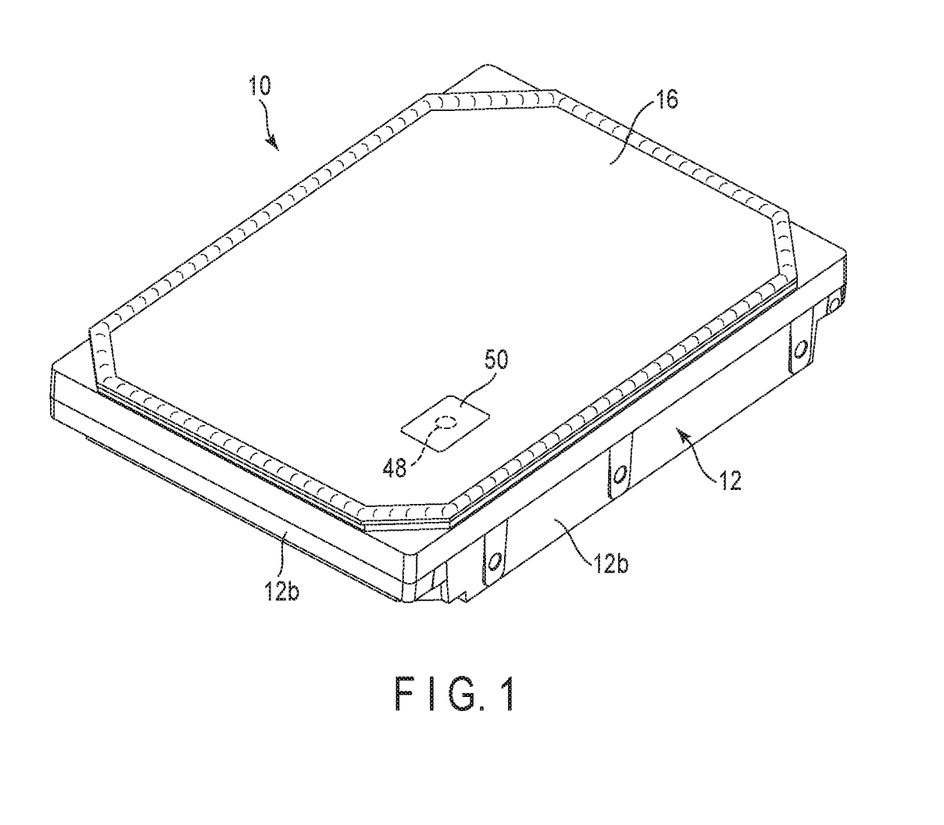
FIG. 1 is a perspective view showing the external appearance of a hard disk drive (HDD) according to the first embodiment.
Figure 2:
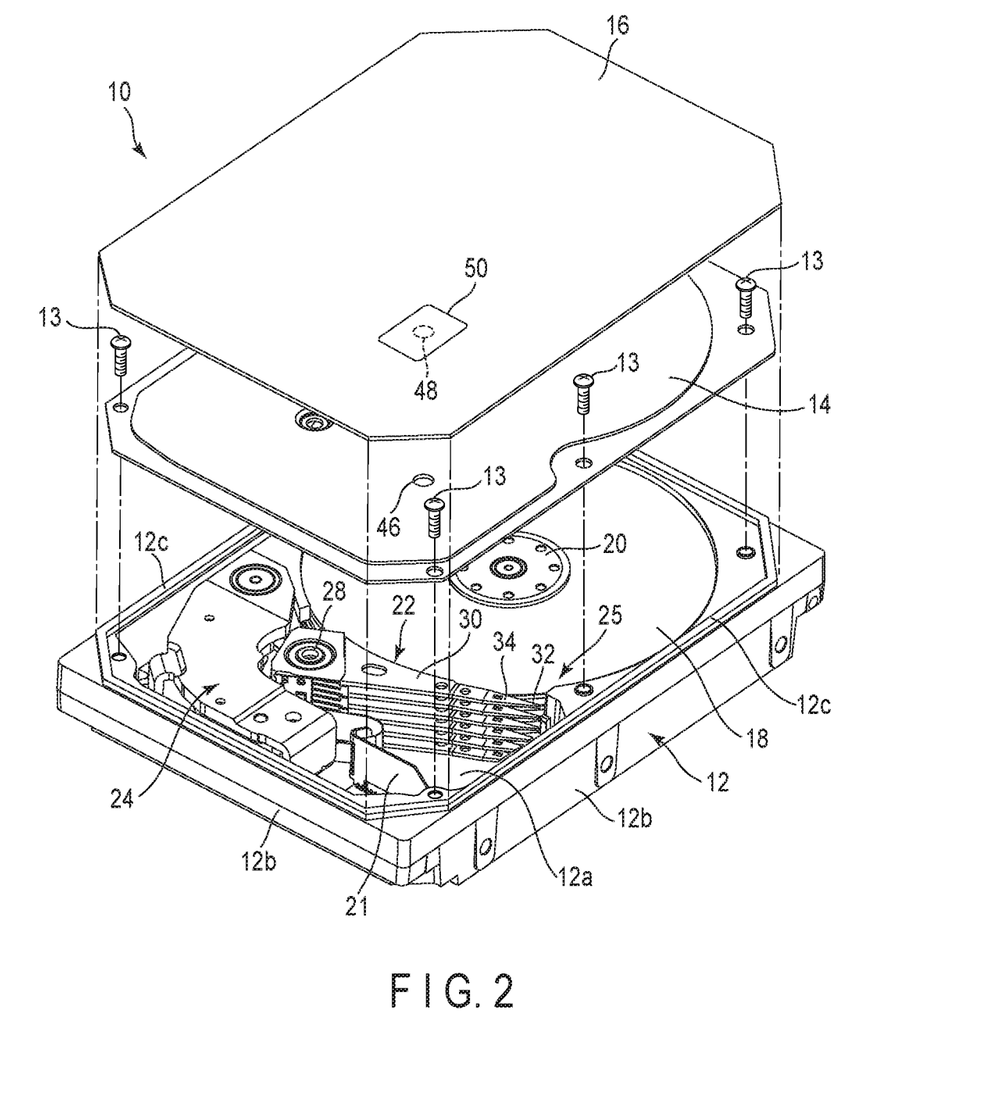
FIG. 2 is an exploded perspective view showing the HDD.

First, the first embodiment will be explained. FIG. 1 is a perspective view showing the external appearance of an HDD according to the first embodiment. FIG. 2 is an exploded perspective view showing the internal structure of the HDD.

As shown in FIGS. 1 and 2, the HDD comprises a substantially rectangular housing 10. This housing 10 has a base 12 having the shape of a rectangular box which is open at its top, an inner cover 14 fixed to the base 12 with a plurality of screws 13 and closing the top opening of the base 12, and an outer cover (top cover) 16 overlaid on the inner cover 14 and welded to the base 12 in its circumferential edge portion. The base 12 has a rectangular bottom wall 12a opposed to the inner cover 14 across a space and sidewalls 12b standing along the circumferential edges of the bottom wall 12a, and is integrally formed of, for example, aluminum. The sidewalls 12b include a pair of long side walls opposed to each other and a pair of short side walls opposed to each other. A fixing rib 12c having the shape of a substantially rectangular frame is disposed on and projects from the top surfaces of the sidewalls 12b.

The inner cover 14 is formed of stainless steel and has the shape of a rectangular plate, for example. The inner cover 14 is pressed against the top surfaces of the sidewalls 12b of the base 12 with the screws 13 in its circumferential edge portion, and is fixed on the inner side of the fixing rib 12c. The outer cover 16 is formed of aluminum and has the shape of a rectangular plate, for example. The planar dimensions of the outer cover 16 are slightly greater than those of the inner cover 14. The outer cover 16 is welded to and airtightly fixed to the fixing rib 12c of the base 12 over the entire circumference in its circumferential edge portion.

Vents 46 and 48 through which the inside and the outside of the housing 10 communicate are formed in the inner cover 14 and the outer cover 16, respectively. The air in the housing 10 is discharged through the vents 46 and 48, and a low-density gas (inert gas) which is less dense than air, for example, helium is sealed in the housing 10 through the vents 46 and 48. For example, a sealant (sealing member, sealing material) 50 is stuck on the outer surface of the outer cover 16 so as to close the vent 48.

As shown in FIG. 2, a plurality of, for example, five to nine magnetic disks 18 as recording media, and a spindle motor 20 as a drive motor which supports and rotates the magnetic disks 18 are disposed in the housing 10. The spindle motor 20 is disposed on the bottom wall 12a. Each magnetic disk 18 has a diameter of, for example, 95 mm (3.5 inches) and has a magnetic recording layer on its upper surface and/or lower surface. The magnetic disks 18 are fitted coaxially on and clapped with a clamp spring to a hub of the spindle motor 20 which is not illustrated, and are thereby fixed to the hub. Accordingly, each magnetic disk 18 is supported in a state of being located parallel to the bottom wall 12a of the base 12. The magnetic disks 18 are rotated at a given rotational frequency by the spindle motor 20. The magnetic disks 18 are disposed in a rotatable manner.

Note that, although five to nine magnetic disks 18 are accommodated in the housing 10 in the present embodiment, the number of magnetic disks 18 is not limited to them. In addition, a single magnetic disk 18 may be accommodated in the housing 10.

A plurality of magnetic heads 32 as a plurality of heads which record and reproduce information on and from the magnetic disks 18, and a head stack assembly (actuator) 22 which supports the magnetic heads 32 in a movable manner with respect to the magnetic disks 18 are disposed in the housing 10. In addition, a voice coil motor (hereinafter referred to as a VCM) 24 which rotates and positions the head stack assembly 22, a ramped load mechanism 25 which holds the magnetic heads 32 at an unloading position away from the magnetic disks 18 when the magnetic heads 32 are moved to the outermost circumferences of the magnetic disk 18, and a board unit (first internal wiring member, first internal wiring) 21 where an electronic component such as a conversion connector (first connector) 62a is mounted are disposed in the housing 10. The board unit 21 is composed of a flexible printed circuit (FPC). This FPC is electrically connected to the magnetic heads 32 and a voice coil of the VCM 24 via a relay FPC on the head stack assembly 22. Note that the board unit 21 may be a rigid flexible printed wiring board including both a rigid portion and a flexible portion.

The head stack assembly 22 comprises a rotatable bearing unit 28, a plurality of arms 30 extending from the bearing unit 28, and suspensions 34 extending respectively from the arms 30. The magnetic heads 32 are supported respectively on the tip portions of the suspensions 34.

Figure 3:
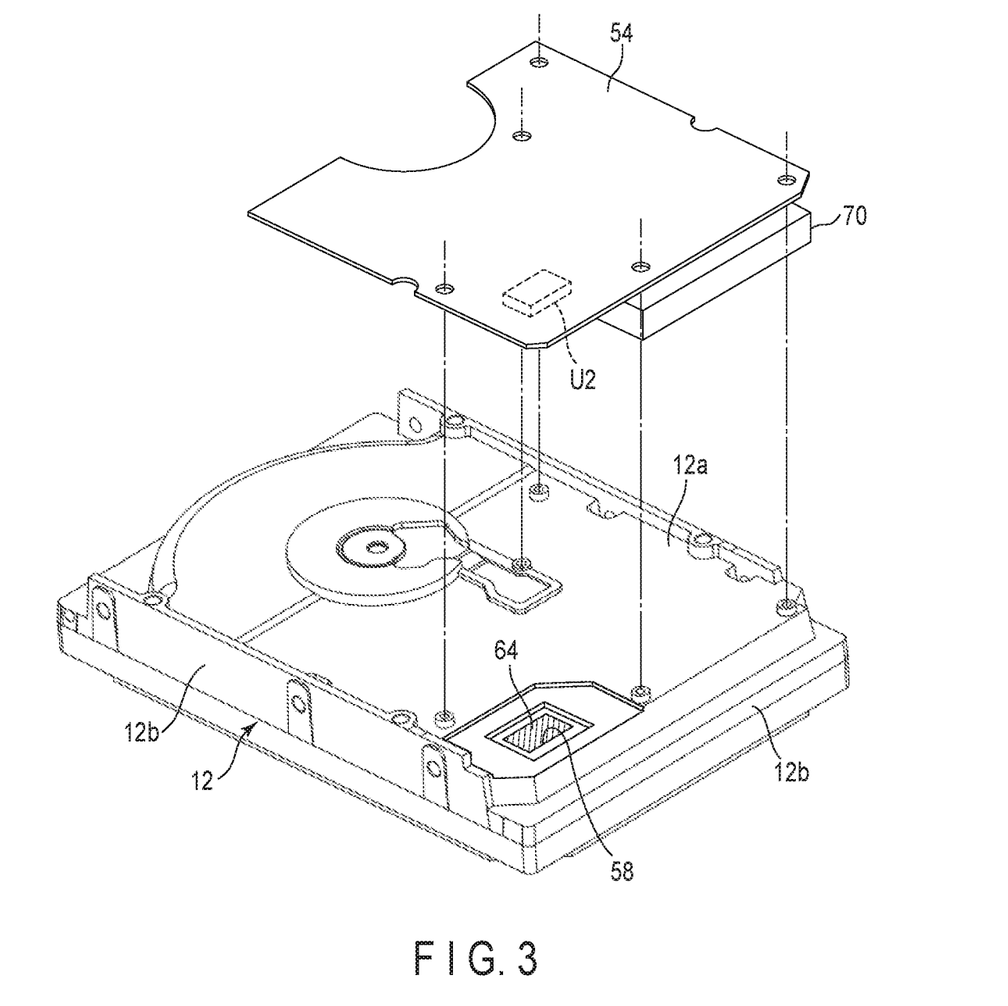
FIG. 3 is an exploded perspective view showing the rear surface side of a base of the HDD and a control circuit board.

FIG. 3 is an exploded perspective view showing the rear surface side of the housing 10 of the HDD and a control circuit board.

As shown in FIGS. 2 and 3, a control circuit board 54 is located on the outer side of the housing 10 and is mounted on the housing 10. In the present embodiment, the control circuit board 54 is formed of a printed wiring board (PWB). In addition, the control circuit board 54 is fixed to the outer surface of the bottom wall 12a of the base 12 with screws. The control circuit board 54 controls the operation of the spindle motor 20 and also controls the operations of the VCM 24 and the magnetic heads 32 via the board unit 21.

The bottom wall 12a of the base 12 has, for example, a rectangular first transmission hole (through hole) 58 in its end portion on one short side. The first transmission hole 58 is open in the inner surface and outer surface (rear surface) of the bottom wall 12a. The first transmission hole 58 is closed with the first sealing member 64. In the present embodiment, the first sealing member 64 is formed of epoxy-based resin. By curing resin, the first sealing member 64 bonded to the inner circumferential surface of the bottom wall 12a in the first transmission hole 58 is formed. Note that the First sealing member 64 may be formed of glass or ceramic.

An interface (I/F) connector 70, a second wireless unit U2 and the like are disposed in the control circuit board 54. Note that various memories such as a RAM, a ROM and a buffer memory, a coil, a capacitor and other electronic components are further mounted in the control circuit board 54.

The I/F connector 70 is an example of an external connector. The I/F connector 70 is a connector conforming to an interface standard such as Serial ATA and is connected to, for example, the I/F connector of a host computer. The control circuit board 54 can receive power and receive and transmit various data such as access commands (control signals) such as a write command and a read command through the I/F connector 70. In the present embodiment, power is wiredly fed from the outside of the HDD to the control circuit board 54, and the control circuit board 54 wiredly communicates with the outside of the HDD. However, power may be wirelessly fed from the outside to the HDD, and the HDD may wirelessly communicate with the outside.

Figure 4:
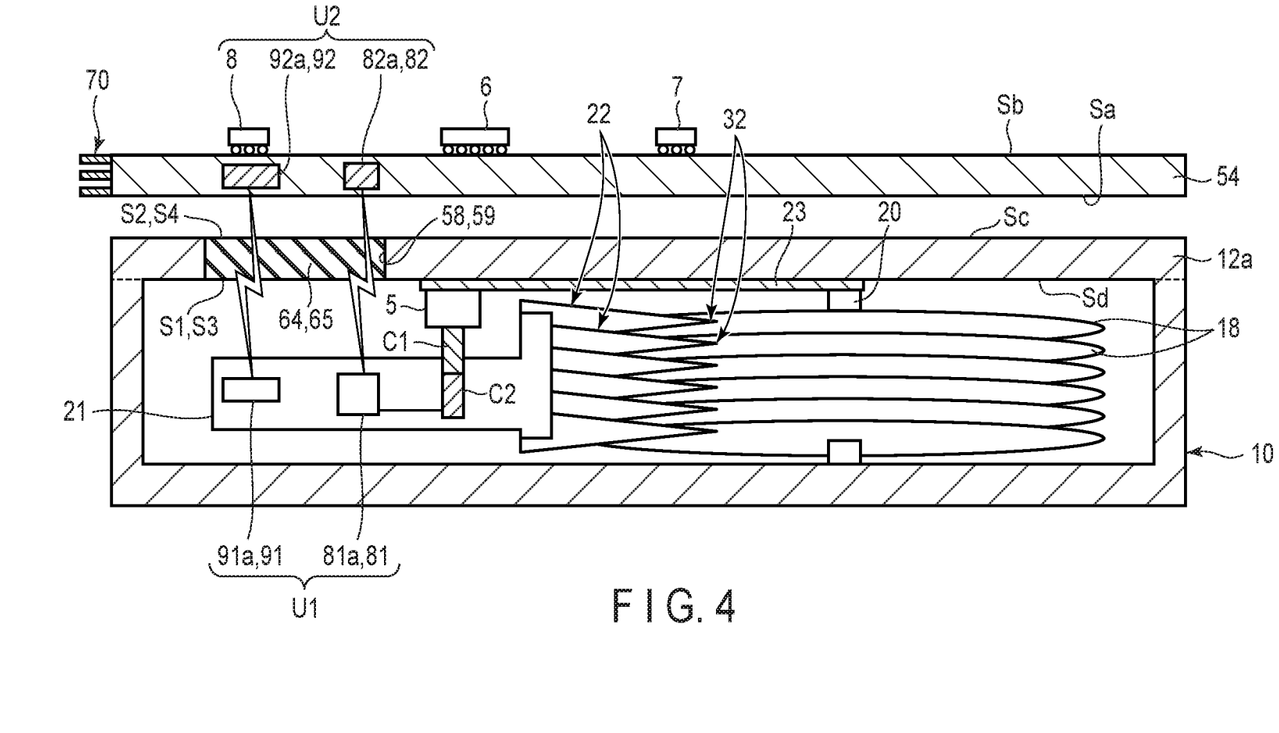
FIG. 4 is a cross-sectional view showing the HDD.

FIG. 4 is a cross-sectional view showing the HDD. As shown in FIG. 4, the first transmission hole 58 is located on a side opposed to the control circuit board 54 of the housing 10 and is formed in the bottom wall 12a. The first sealing member 64 closes the first transmission hole 58. The first sealing member 64 has an inner surface S1 facing the inner side of the housing 10, and an outer surface S2 exposed to the outer side of the housing 10.

The HDD further comprises a first wireless unit U1, a second wireless unit U2, a board unit (second internal wiring member, second internal wiring) 23, a secondary battery 5, a CPU 6, a motor control IC 7, a first connector C1 and a second connector C2.

The first wireless unit U1 comprises a first wireless power feeding device 81 and a first wireless communication device 91. The first wireless power feeding device 81 has a first power feeding antenna 81a. The first power feeding antenna 81a is located more inward of the housing 10 than the outer surface S2 of the first sealing member 64. In the present embodiment, the first power feeding antenna 81a is mounted on the board unit 21. The first power feeding antenna 81a receives power transmitted through the first sealing member 64 and the first transmission hole 58 by wireless power feeding.

The housing 10 has a second transmission hole 59, and the HDD comprises a second sealing member (second sealing material) 65. The second sealing member 65 has an inner surface S3 facing the inner side of the housing 10 and an outer surface S4 exposed to the outer side of the housing 10, and closes the second transmission hole 59. In the present embodiment, the first transmission hole 58 is the second transmission hole 59. In other words, the first transmission hole 58 and the second transmission hole 59 are the same transmission hole. In addition, the first sealing member 64 is the second sealing member 65. In other words, the first sealing member 64 and the second sealing member 65 are the same member.

The first wireless communication device 91 has a first communication antenna 91a. The first communication antenna 91a is located more inward of the housing 10 than the outer surface S4 of the second sealing member 65. In the present embodiment, the first communication antenna 91a is mounted on the board unit 21. The first communication antenna 91a performs wireless communication with the outside of the housing 10 through the second sealing member 65.

The second wireless unit U2 comprises a second wireless power feeding device 82, a second wireless communication device 92, and a wireless control IC 8 which controls the operations of the second wireless power feeding device 82 and the second wireless communication device 92. The second wireless power feeding device 82 has a second power feeding antenna 82a and is disposed in the control circuit board 54. In the present embodiment, the second power feeding antenna 82a is formed of a metal layer inside the control circuit board 54.

Power can be transmitted from the second power feeding antenna 82a to the first power feeding antenna 81a by wireless power feeding. In the present embodiment, the first power feeding antenna 81a and the second power feeding antenna 82a are opposed to each other through the outer surface S2 of the first sealing member 64 in an area surrounded by the first transmission hole 58. Therefore, power can be excellently transmitted from the second power feeding antenna 82a to the first power feeding antenna 81a by wireless power feeding.

Note that a part of the power output from the second power feeding antenna 82a may be blocked by the housing 10. At least a part of the power output from the second power feeding antenna 82a needs to be fed to the first power feeding antenna 81a.

Here, a wireless power feeding method will be explained. As the wireless power feeding method, various generally-known methods can be applied. Examples of the wireless power feeding method are an electromagnetic induction method, a magnetic field resonance method, an electric field coupling method, and a radio wave transmission method.

The second wireless communication device 92 has a second communication antenna 92a and is disposed in the control circuit board 54. In the present embodiment, the second communication antenna 92a is formed of a metal layer inside the control circuit board 54. The second communication antenna 92a performs wireless communication with the first communication antenna 91a through the second sealing member 65 and the second transmission hole 59.

The control circuit board 54 has an opposed surface Sa opposed to the housing 10, and a rear surface Sb located on a side opposite to the opposed surface Sa. In the present embodiment, the CPU 6, the motor control IC 7 and the wireless control IC 8 are mounted on the rear surface Sb of the control circuit board 54. Note that at least one electronic component of the CPU 6, the motor control IC 7 and the wireless control IC 8 may be mounted on the opposed surface Sa of the control circuit board 54.

The board unit 21 is electrically connected to the magnetic heads 32. The first power feeding antenna 81a is electrically connected to the magnetic heads 32 and the above-described VCM 24 via the board unit 21.

The board unit (second internal wiring member) 23 is disposed inside the housing 10 and is electrically connected to the spindle motor 20. In the present embodiment, the board unit 23 is composed of an FPC. Note that the board unit 23 may be a rigid flexible printed wiring board. The first power feeding antenna 81a is electrically connected to the spindle motor 20 via the board unit 23, etc.

From the above, the magnetic heads 32, the VCM 24, the spindle motor 20 and the like can be driven by the power obtained by wireless power feeding.

The secondary battery 5 which is a rechargeable battery is disposed inside the housing 10. The board unit 23 is electrically connected to the secondary battery 5. The first connector C1 is electrically connected to the secondary battery 5. The second connector C2 is electrically connected to the board unit 21. The second connector C2 is connected to the first connector C1. Here, the first connector C1 is one of a pair of connectors fitted together, and the second connector C2 is the other of the pair of connectors fitted together. In the present embodiment, the first connector C1 is a concave connector (receptacle), and the second connector C2 is a convex connector (plug).

The secondary battery 5 is electrically connected to the first power feeding antenna 81a via the first connector C1, the second connector C2 and the wiring line of the board unit 21. The secondary battery 5 is charged via the first power feeding antenna 81a (first wireless power feeding device 81). The charging period of the secondary battery 5 is net limited to any particular period of time, and the secondary battery 5 can be charged until the secondary battery 5 is fully charged. The charging period of the secondary battery 5 may be a period of time in which information is not recorded or reproduced on or from the magnetic disks 18 or may be a period of time in which information is recorded and reproduced on and from the magnetic disks 18.

For example, 5 to 100% of power necessary for recording and reproducing information on and from the magnetic disks 18 can be obtained by discharging from the secondary battery 5. Since the secondary battery 5 can cover all necessary power, even when power feeding to the I/F connector 70 is temporarily interrupted or wireless power feeding to the first power feeding antenna 81a is temporarily interrupted, information can be continuously recorded and reproduced on and from the magnetic disks 18.

According to the first embodiment composed as described above, the HDD comprises the housing 10, the magnetic disks 18, the magnetic heads 32, the first sealing member (first sealing material) 64, the first wireless power feeding device 81 and the like. The first power feeding antenna 81a is located mere inward of the housing 10 than the outer surface S2 of the first sealing member 64, and can receive power transmitted through the first sealing member 64 by wireless power feeding. Therefore, an HDD which can be wirelessly powered can be obtained.

It Is not necessary to wiredly feed power to an electronic component inside the housing 10 or wiredly communicate with an electronic component inside the housing 10. It is not necessary to use a board-to-board connector (B to B) for connecting the control circuit board 54 and the housing 10 side. For example, it is not necessary to attach a connector to the first sealing member 64. Accordingly, an increase in the size of the first sealing member 64 can be suppressed, and a leakage of helium gas in the housing 10 can be suppressed.

Note that, as the size of the connector attached to the first sealing member 64 increases or the number of connectors attached to the first sealing member 64 increases, the size of the first sealing member 64 increases, and helium gas becomes more likely to leak to the outside of the housing 10 through the first sealing member 64. In addition, the manufacturing yield decreases due to the position accuracy of the connector attached to the first sealing member 64 such as an angular deviation of the connector, and the development cost of the connector increases. Since an increase in the size of the first transmission hole 58 and an increase in the size of the first sealing member 64 can be suppressed, the manufacturing design of the HDD becomes less likely to be limited.

Second Embodiment

Figure 5:
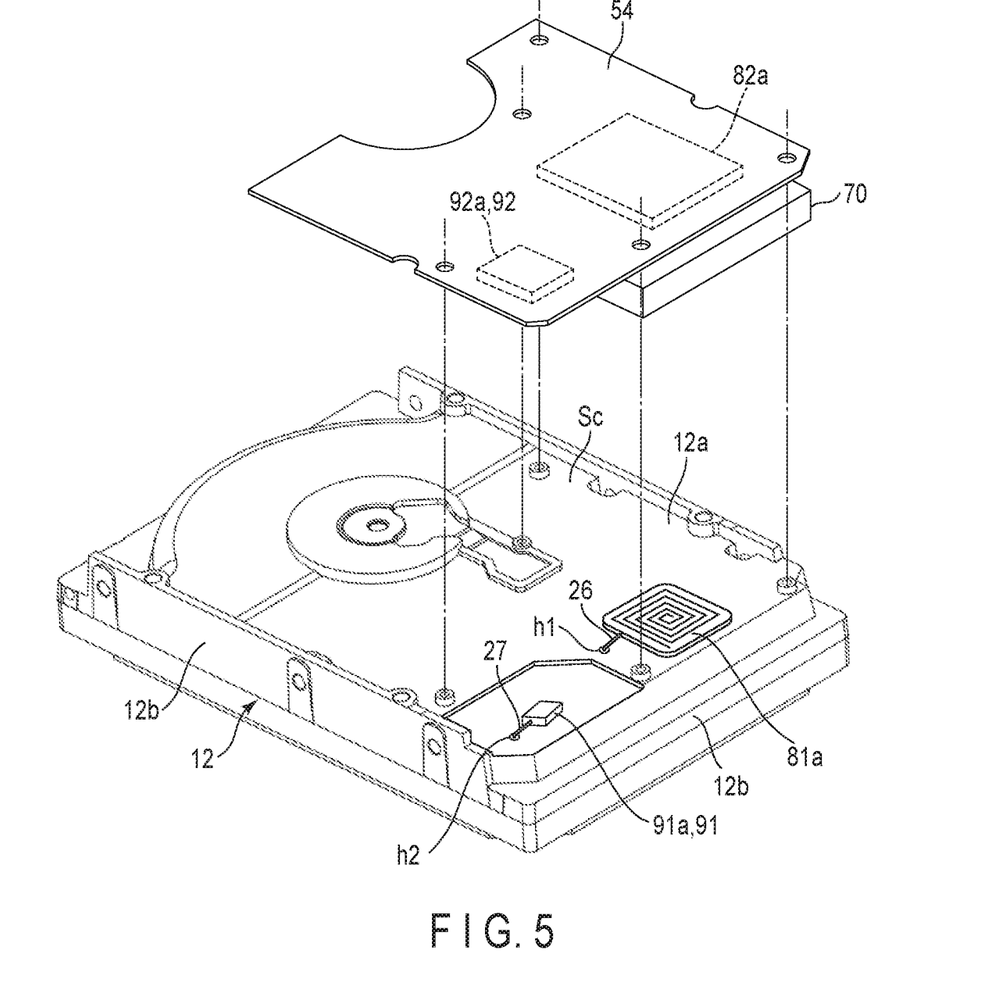
FIG. 5 is an exploded perspective view showing the rear surface side of a base of an HDD and a control circuit board according to the second embodiment.

Next, the second embodiment will be explained. In the second embodiment, differences from the above-described first embodiment will be explained. FIG. 5 is an exploded perspective view showing the rear surface side of the housing 10 of the HDD and the control circuit board 54 according to the second embodiment.

As shown in FIG. 5, the HDD further comprises a board unit (power feeding wiring member, power feeding wiring) 26 and a board unit (communication wiring member, communication wiring) 27. The first power feeding antenna 81a and the first communication antenna 91a (first wireless communication device 91) are located on the outer side of the housing 10. In the present embodiment, the first power feeding antenna 81a and the first communication antenna 91a (first wireless communication device 91) are mounted on an outer surface (rear surface) Sc of the bottom wall 12a.

A first insertion hole h1 and a second insertion hole h2 are formed in the bottom wall 12a. Each of the first insertion hole h1 and the second insertion hole h2 is open on the inner surface and outer surface Sc of the bottom wall 12a. The beard unit 26 is drawn through the first insertion hole h1, is located outside the housing 10, and is electrically connected to the first power feeding antenna 81a. The board unit 27 is drawn through the second insertion hole h2, is located outside the housing 10, and is electrically connected to the first communication antenna 91a (first wireless communication device 91).

The second power feeding antenna 82a and the second communication antenna 92a (second wireless communication device 92) are disposed in the control circuit board 54.

Figure 6:
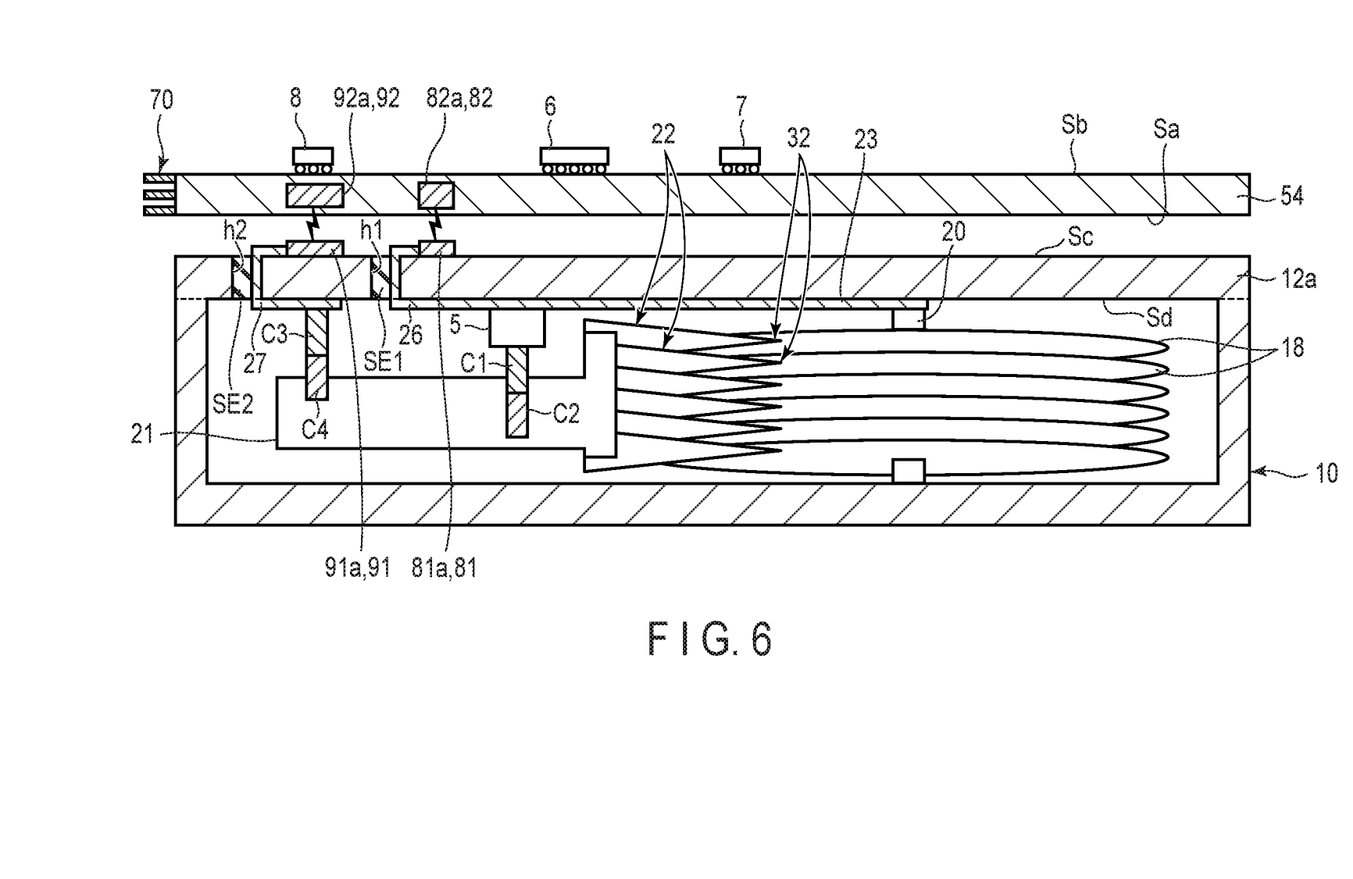
FIG. 6 is a cross-sectional view showing the HDD.

FIG. 6 is a cross-sectional view showing the HDD of the present embodiment. As shown in FIG. 6, the housing 10 does not have the first transmission hole 56 and the second transmission hole 59. In the present embodiment, the first, insertion hole h1 and the second insertion hole h2 are spaced apart from each other and formed independently of each other in the housing 10.

The board unit 26 is drawn through the first insertion hole h1 and is located inside and outside the housing 10. The board unit 26 is electrically connected to the secondary battery 5. The board unit 26 is composed of an FPC. In the present embodiment, the board unit 26 is integrally formed with the board unit 23. The first power feeding antenna 81a is electrically connected to the board unit 26, and receives power transmitted from the outside of the housing 10 by wireless power feeding. In the present embodiment, the first power feeding antenna 81a receives power transmitted from the second power feeding antenna 32a.

The board unit 27 is drawn through the second insertion hole h2 and is located inside and outside the housing 10. The board unit 27 is composed of an FPC. In the present embodiment, the board unit 27 is physically independent of the board unit 26. The first communication antenna 91a is electrically connected to the board unit 27 and performs wireless communication with the outside of the housing 10. In the present embodiment, the first communication antenna 91a receives power transmitted from the second communication antenna 92a.

The first sealant SE1 fills the first insertion hole h1, and closes the first insertion hole h1 together with the board unit 26. The second sealant SE2 fills the second insertion hole h2, and closes the second insertion hole h2 together with the board unit 27. The first sealant SE1 and the second sealant SE2 are formed of an adhesive material. As the adhesive material, resin such as epoxy-based resin can be used. By curing the resin filling the first insertion hole h1, the first sealant SE1 bended to the inner circumferential surface of the bottom wall 12a and the board unit 26 in the first insertion hole h1 is formed. In addition, by curing the resin filling the second insertion hole h2, the second sealant SE2 bonded to the inner circumferential surface of the bottom wall 12a and the board unit 27 in the second insertion hole h2 is formed.

The HDD further comprises a third connector C3 and a fourth connector C4. The third connector C3 is electrically connected to the board unit 27. The fourth connector C4 is electrically connected to the board unit 21. The fourth connector C4 is connected to the third connector C3. Here, the third connecter C3 is one of a pair of connectors fitted together, and the fourth connecter C4 is the other of the pair of connectors fitted together. Here, the third connector C3 is a concave connector, and the fourth connector C4 is a convex connector.

The first communication antenna 91a (first wireless communication device 91) is electrically connected to the board unit 21 via the board unit 21, the third connector C3 and the fourth connector C4.

According to the second embodiment composed as described above, substantially the same effects as those of the above-described first embodiment can be obtained, and an HDD which can be wirelessly powered can be obtained.

The first power feeding antenna 81a and the first communication antenna 91a are located on the outer side of the housing 10. The holes formed in the housing 10 are the first insertion hole h1 smaller in size than the first transmission hole 58 and the second insertion hole h2 smaller in size than the second transmission hole 59. Therefore, a leakage of helium gas to the outer side of the housing 10 can be further suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. For example, two or more of the above embodiments and the following modifications nay be appropriately combined.

Next, some modifications of the above-described first embodiment, will be explained. Here, differences from the above-described first embodiment will be explained.

Modification 1 of First Embodiment

Figure 7:
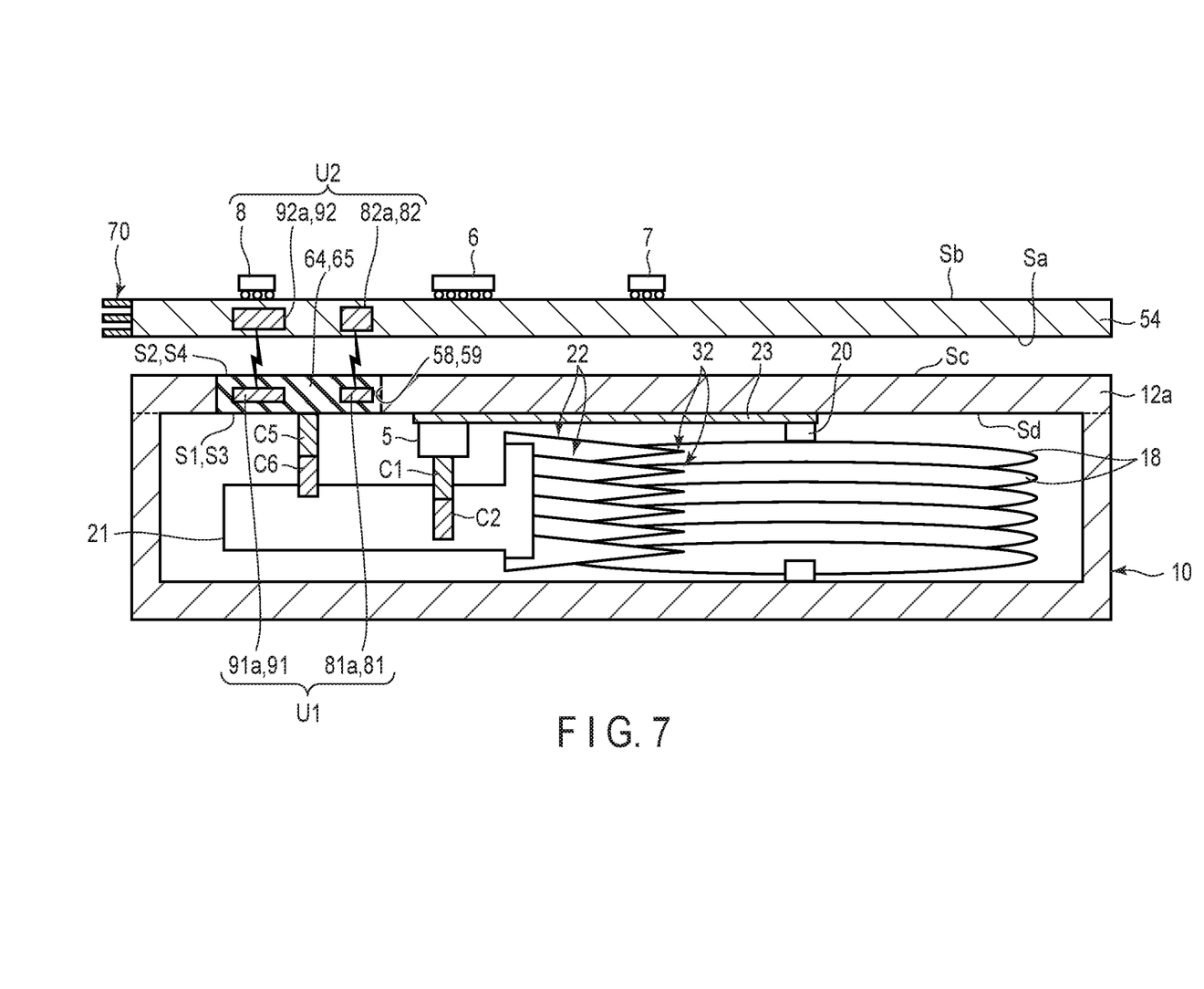
FIG. 7 is a cross-sectional view showing an HDD according to a modification of the first embodiment.

As shown in FIG. 7, the first sealing member 64 (second sealing member 65) is formed of a printed circuit board (PCB). The first power feeding antenna 81a is formed of a metal layer inside the first, sealing member 64. The first communication antenna 91a is formed of a metal layer inside the second sealing member 65.

The HDD further comprises the fifth connector C5 and the sixth connector C6. The fifth connector C5 is electrically connected to the first sealing member 64. The sixth connector C6 is electrically connected to the board unit 21. The sixth connector C6 is connected to the fifth connector C5. Here, the fifth connector C5 is one of a pair of connectors fitted together, and the sixth connector C6 is the other of the pair of connectors fitted together. Here, the fifth connector C5 is a concave connector, and the sixth connector C6 is a convex connector.

The first power feeding antenna 81a and the first communication antenna 91a are electrically connected to the board unit 21 via the first sealing member 64 (second sealing member 65), the fifth connector C5 and the sixth connector C6.

Modification 2 of First Embodiment

As compared with the configuration of the HDD shown in FIG. 4, the first sealing member 64 (second sealing member 65) is formed of a rigid flexible printed wiring board. In the first sealing member 64 (second sealing member 65), its rigid portion closes the first transmission hole 58 and the second transmission hole 59, and its flexible portion is electrically connected to the board unit 21. For example, the first sealing member 64 (second sealing member 65) is integrally formed with the board unit 21. In this case, the HDD may not use the fifth connector C5 and the sixth connector C6.

Modification 3 of First Embodiment

As compared with the configuration of the HDD shown in FIG. 4, the HDD may be composed without the secondary battery 5. In this case also, the HDD can record information on and reproduce information from the magnetic disks 18 by wireless power feeding.

Modification 4 of First Embodiment

As compared with the configuration of the HDD shown in FIG. 7, the first power feeding antenna 81a is mounted on the inner surface S1 of the first sealing member 64. Note that the first power feeding antenna 81a only needs to be located more inward of the housing 10 than the outer surface S2 and may be mounted on a member other than the first sealing member 64 and the board unit 21.

The first communication antenna 91a is mounted on the inner surface S3 of the second sealing member 65. Note that the first communication antenna 91a only needs to be located more inward of the housing 10 than the outer surface S4 and may be mounted on a member other than the second sealing member 65 and the board unit 21.

The second power feeding antenna 82a is disposed on the opposed surface Sa of the control circuit board 54. Note that the second power feeding antenna 82a only needs to be disposed on the control circuit board 54 and may be disposed on the rear surface Sb of the control circuit board 54.

The second communication antenna 92a is disposed on the opposed surface 5a of the control circuit board 54. Note that the second communication antenna 92a only needs to be disposed in the control circuit board 54 and may be disposed on the rear surface Sb of the control circuit board 54.

Modification 5 of First Embodiment

As compared with the configuration of the HDD shown in FIG. 7, the first transmission hole 58 closed with the first sealing member 64 may not be formed in the bottom wall 12a. The first transmission hole 58 may be formed in a portion other than the bottom wall 12a of the housing 10, such as the sidewall 12b. The first transmission hole 58 and the first sealing member 64 disposed in an appropriate portion can be used. For example, since the first power feeding antenna 81a can receive power from an external antenna different from the second power feeding antenna 82a, the degree of flexibility in wireless power feeding can be increased.

Similarly, the second transmission hole 59 closed with the second sealing member 65 may not be formed in the bottom wall 12a. The second transmission hole 59 may be formed in a portion other than the bottom wall 12a of the housing 10, such as the sidewall 12b. The second transmission hole 59 and the second sealing member 65 disposed in an appropriate portion can be used. For example, since the first communication antenna 91a can perform wireless communication with an external antenna different from the second communication antenna 92a, the degree of flexibility in wireless communication can be increased.

Modification 6 of First Embodiment

As compared with the configuration of the HDD shown in FIG. 4, the first transmission hole 58 and the second transmission hole 59 may be spaced apart from each other and may be formed independently of each other in the housing 10. In this case, the first sealing member 64 and the second scaling member 65 may be separated from each other.

Modification 7 of First Embodiment

As compared with the configurations of the HDDs shown in FIGS. 4 and 7, the first sealing member 64 and the second sealing member 65 may be formed in the shape of a plate in advance. Here, the first sealing member 64 is explained as a representative example.

The first sealing member 64 may be bonded to the outer surface Sc of the bottom wall 12a by a frame-shaped adhesive member surrounding the first transmission hole 58. Alternatively, the first sealing member 64 may be bonded to the inner surface Sd of the bottom wall 12a by a frame-shaped adhesive member surrounding the first transmission hole 58.

Alternatively, an O-ring surrounding the first transmission hole 58 may be interposed between the first sealing member 64 and the outer surface Sc of the bottom wall 12a, and the first sealing member 64 may be pressed against the outer surface Sc of the bottom wall 12a with screws and fixed to the bottom wall 12a. Alternatively, an O-ring may be interposed between the first sealing member 64 and the inner surface Sd of the bottom wall 12a, and the first sealing member 64a may be pressed against the inner surface Sd of the bottom wall 12a with screws and fixed to the bottom wall 12a.

Next, some modifications of the above-described second embodiment will be explained. Here, differences from the above-described second embodiment will be explained.

Modification 1 of Second Embodiment

As compared with the configuration of the HDD shown in FIG. 6, the HDD may be composed without the secondary battery 5. In this case also, the HDD can record and reproduce information on and from the magnetic disks 18 by wireless power feeding.

Modification 2 of Second Embodiment

As compared with the configuration of the HDD shown in FIG. 6, the second power feeding antenna 82a is disposed on the opposed surface Sa of the control circuit board 54. Note that the second power feeding antenna 82a may be disposed on the rear surface Sb of the control circuit board 54. The second communication antenna 92a is disposed on the opposed surface Sa of the control circuit board 54. Note that the second communication antenna 92a may be disposed on the rear surface 5b of the control circuit board 54.

Modification 3 of Second Embodiment

As compared with the configuration of the HDD shown in FIG. 6, the first insertion hole h1 and the second insertion hole h2 may not be formed in the bottom wall 12a but may be formed in a portion other than the bottom, wall 12a of the housing 10, such as the sidewall 12b.

Modification 4 of Second Embodiment

As compared with the configuration of the HDD shown in FIG. 6, the board unit 27 may be integrally formed with the board unit 26.

Modification 5 of Second Embodiment

As compared with the configuration of the HDD shown in FIG. 6, the first insertion hole h1 and the second insertion hole h2 may be formed of the same through hole. In this case, the first sealant SE1 and the second sealant SE2 are the same.

Next, some common modifications of the first embodiment and the second embodiment will be explained.

The board unit 23 is physically independent of the board unit 21 but may be integrally formed with the board unit 21. In this case, the HDD may not use the first connector C1 and the second connector C2.

The sizes, shapes and numbers of the first power feeding antenna 81a, the second power feeding antenna 82a, the first communication antenna 91a and the second communication antenna 92a are not limited to those of the above-described examples but may be variously modified. For example, the HDD may comprise two or more first power feeding antennas 81a, two or more second power feeding antennas 82a, two or more first communication antennas 91a and two or more second communication antennas 91a.

The materials, shapes, sizes and the like of the elements constituting the disk drive may be modified as needed. In the disk drive, the number of magnetic disks and the number of magnetic heads may be increased or decreased as needed, and the size of the magnetic disks may be selected from various sizes. The materials, shapes, sizes and the like of the elements constituting the magnetic disk device are not limited to those of the above-described embodiments but may be variously changed as needed. The gas sealed in the housing is not limited helium but may be appropriately selected from other gases.

What is claimed is:

1. A disk device comprising:
a housing defining an internal cavity, and having a first transmission hole;
a magnetic disk disposed in a rotatable manner inside the housing;
a head disposed inside the housing and recording and reproducing information on and from the magnetic disk;
a first sealing material having an inner surface facing an inner side of the internal cavity of the housing and an outer surface exposed to an outer side of the housing, and closing the first transmission hole; and
a first wireless power feeding device having a first power feeding antenna,
wherein
the first power feeding antenna is located more inward of the housing than the outer surface of the first sealing material, and receives power transmitted through the first sealing material by wireless power feeding.

2. The disk device of claim 1, further comprising:
a control circuit board located on the outer side of the housing and mounted on the housing; and
a second wireless power feeding device having a second power feeding antenna and disposed in the control circuit board,
wherein
the first transmission hole is located on a side opposed to the control circuit board of the housing,
the first power feeding antenna and the second power feeding antenna are opposed to each other through the outer surface of the first sealing material, and
the power is transmitted from the second power feeding antenna to the first power feeding antenna by the wireless power feeding.

3. The disk device of claim 1, further comprising:
a control circuit board located on the outer side of the housing and mounted on the housing; and
a second wireless power feeding device having a second power feeding antenna and disposed in the control circuit board,
wherein
the power is transmitted from the second power feeding antenna to the first power feeding antenna by the wireless power feeding.

4. The disk device of claim 1, wherein a low-density gas which is less dense than air is sealed in the housing.

5. The disk device of claim 1, further comprising
a secondary battery disposed inside the housing and charged via the first wireless power feeding device.

6. The disk device of claim 1, further comprising:
a first internal wiring disposed inside the housing and electrically connected to the head,
wherein
the first power feeding antenna is electrically connected to the head via the first internal wiring.

7. The disk device of claim 1, further comprising:
a drive motor supporting and rotating the magnetic disk; and
a second internal wiring disposed inside the housing and electrically connected to the drive motor,
wherein
the first power feeding antenna is electrically connected to the drive motor via the second internal wiring.

8. The disk device of claim 1, further comprising:
a second sealing material; and a first wireless communication device having a first communication antenna, wherein the housing has a second transmission hole, the second sealing material has an inner surface facing the inner side of the internal cavity of the housing and an outer surface exposed to the outer side of the housing, and closing the second transmission hole, and the first communication antenna is located more inward of the housing than the outer surface of the second sealing material, and performs wireless communication with outside the housing through the second sealing material.

9. The disk device of claim 1, further comprising:
a communication wiring;
a second sealant; and
a first wireless communication device comprising a first communication antenna, wherein the housing has a second insertion hole, the communication wiring is drawn through the second insertion hole and is located inside and outside the housing, the second sealant closes the second insertion hole together with the communication wiring, and the first communication antenna is located on the outer side of the housing, is electrically connected to the communication wiring, and performs wireless communication with outside the housing.

10. A disk device comprising:
a housing having a first insertion hole;
a magnetic disk disposed in a rotatable manner inside the housing;
a head disposed inside the housing and recording and reproducing information on and from the magnetic disk;
a power feeding wiring drawn through the first insertion hole and located inside and outside the housing;
a first sealant closing the first insertion hole together with the power feeding wiring; and
a first wireless power feeding device having a first power feeding antenna, wherein the first power feeding antenna is located on an outer side of the housing, is electrically connected to the power feeding wiring, and receives power transmitted from outside the housing by wireless power feeding.

11. The disk device of claim 10, further comprising:
a control circuit board located on the outer side of the housing and mounted on the housing; and
a second wireless power feeding device having a second power feeding antenna and disposed in the control circuit board, wherein the power is transmitted from the second power feeding antenna to the first power feeding antenna by the wireless power feeding.

12. The disk device of claim 10, wherein a low-density gas which is less dense than air is sealed in the housing.

13. The disk device of claim 10, further comprising
a secondary battery disposed inside the housing and charged via the first wireless power feeding device.

14. The disk device of claim 10, further comprising:
a first internal wiring disposed inside the housing and electrically connected to the head, wherein the first power feeding antenna is electrically connected to the head via the first internal wiring.

15. The disk device of claim 10, further comprising:
a drive motor supporting and rotating the magnetic disk; and
a second internal wiring disposed inside the housing and electrically connected to the drive motor, wherein the first power feeding antenna is electrically connected to the drive motor via the second internal wiring.

16. The disk device of claim 10, further comprising:
a second sealing material; and
a first wireless communication device having a first communication antenna, wherein the housing has a second transmission hole, the second sealing material has an inner surface facing the inner side of the internal cavity of the housing and an outer surface exposed to the outer side of the housing, and closing the second transmission hole, and the first communication antenna is located more inward of the housing than the outer surface of the second sealing material, and performs wireless communication with outside the housing through the second sealing material.

17. The disk device of claim 10, further comprising:
a communication wiring;
a second sealant; and
a first wireless communication device comprising a first communication antenna, wherein the housing has a second insertion hole, the communication wiring is drawn through the second insertion hole and is located inside and outside the housing, the second sealant closes the second insertion hole together with the communication wiring, and the first communication antenna is located on the outer side of the housing, is electrically connected to the communication wiring, and performs wireless communication with outside the housing.

* * * * *